United States Patent [19]
Hofbauer

[11] 3,820,926
[45] June 28, 1974

[54] SEALING ARRANGEMENT FOR A COMBUSTION ENGINE WITH A ROTARY-TYPE PISTON

[75] Inventor: Peter Hofbauer, Wolfsburg, Germany

[73] Assignee: Volkswagenwerk Aktiengesellschaft, Wolfsburg, Germany

[22] Filed: Sept. 27, 1972

[21] Appl. No.: 292,753

[30] Foreign Application Priority Data
Sept. 28, 1971 Germany............................ 2148254

[52] U.S. Cl. ............................................... 418/144
[51] Int. Cl. ...................... F01c 19/12, F04c 27/00
[58] Field of Search ......... 418/144, 142, 91, 97, 98, 418/99; 123/8.01

[56] References Cited
UNITED STATES PATENTS
3,193,186   7/1965   Peras ............................ 418/144 X FOREIGN PATENTS OR APPLICATIONS
1,526,393   4/1970   Germany ........................... 418/144

Primary Examiner—William L. Freeh
Assistant Examiner—Michael Koczo, Jr.
Attorney, Agent, or Firm—Ernest F. Marmorek

[57] ABSTRACT

In a combustion engine having a rotary-type piston mounted for rotation on an eccentric shaft in a housing having at least a pair of side members and a central member surrounding the rotary-type piston, a sealing arrangement performing the oil and gas-tight sealing of the respective operating spaces and including at least an axial sealing strip provided in the side members and an oil removing strip provided at least in one of the side members for aiding the axial sealing strip in performing its function.

6 Claims, 2 Drawing Figures

SEALING ARRANGEMENT FOR A COMBUSTION ENGINE WITH A ROTARY-TYPE PISTON

FIELD OF THE INVENTION

The present invention relates to a sealing arrangement for a combustion engine having a rotary-type piston therein, especially for combustion engines having a circular rotary-type piston in it and, in which, the piston rotates on an eccentric shaft in a housing which is provided with an oil removal aperture and sealing means which are radial and axial sealing strip means.

BACKGROUND OF THE INVENTION

The axial sealing strip means in a combustion engine having a rotary-type piston arrangement therein has a two-fold function: first, it must define the operating spaces and prevent the combustion gases from leaving such operating spaces, while on the other hand, it must prevent the oil or the lubricating medium from reaching the combustion spaces. Such function and object could not be accomplished so far with an axial sealing strip, so that according to French Patent 1,395,747 one had to use a pair of axial sealing strips lying behind each other and, one of such sealing strips serves for sealing in the gases, while the other sealing strip serves for sealing off the oil.

SUMMARY OF THE INVENTION

It is, therefore, an object of the present invention to provide a sealing arrangement for a combustion engine having a rotary-type piston arrangement therein in which the second axial sealing strip conventionally used for sealing the oil can be omitted.

It is another object of the present invention to provide a sealing arrangement in a combustion engine of the above described type in which the sealing of the oil can be performed without the use of a second axial sealing strip as in conventional engines, or if such second sealing strip is present, it is designed to improve greatly the sealing of the oil.

According to the present invention, in order to assist the axial sealing strip in a combustion engine of the rotary-type piston, there is provided at least one oil removing strip in a side member of the housing. The oil removing strip has a half-moon shape in the direction of rotation and is arranged after the oil removing aperture. The oil removing strip is arranged in an advantageous manner and in such a fashion that it starts off tangentially from the axial sealing strip and ends in the region of a coupling toothed wheel.

By arranging a special oil removing strip after the oil removing aperture, there is accomplished that the axial sealing strip becomes highly relieved, since the field of acceleration drives the oil from the piston directly to the corner; and by receiving only the overflow oil or restraining it, its function of providing a gastight seal and also a certain oil seal, is fully accomplished. The construction of the oil removing strip is relatively simply assembled and it is less costly than the making of the known axial sealing strip for the oil sealing, as mentioned above.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
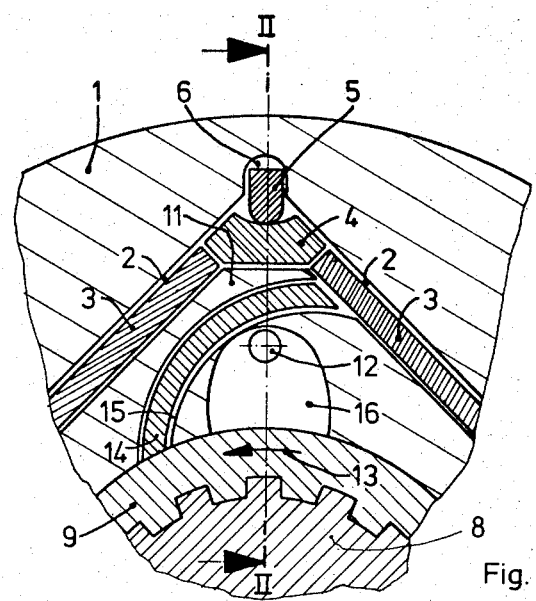
FIG. 1 is a partial section taken along line I—I of FIG. 2 illustrating the gas and oil sealing arrangement within a combustion engine having a rotary-type piston therein and, in which the piston rotates in a housing comprising a pair of side members and a central member for each piston disc.

With reference to the figures it is seen that in a combustion engine with a rotary-type piston arrangement therein, the combustion engine comprises a general housing which has a pair of side members 1 surrounding the rotary-type piston 8 and a central member 7 which connects the two side members. It is noted that this coupling of a pair of side members with a central member refers only to the case when a single piston 8 is present; however, it requires modification by providing intermediate members and additional central members if more than one piston is present. For the understanding of the present invention relating to the sealing arrangement for a rotary-type piston, it is sufficient if the basic case of a single piston arrangement with a pair of side members and a single central member is described.

Again with reference to the figures it is noted that in the side members 1, in a groove 2, there are provided axial sealing strip means 3. If the entire side member would be represented instead of only the partial section of the side member 1 shown in FIG. 1, it would appear that the axial strip 3 forms a symmetrical polygon in the corners of which, especially as seen in FIG. 2, in a groove 6, the ends of a radial sealing strip 5 are placed.

Figure 2:
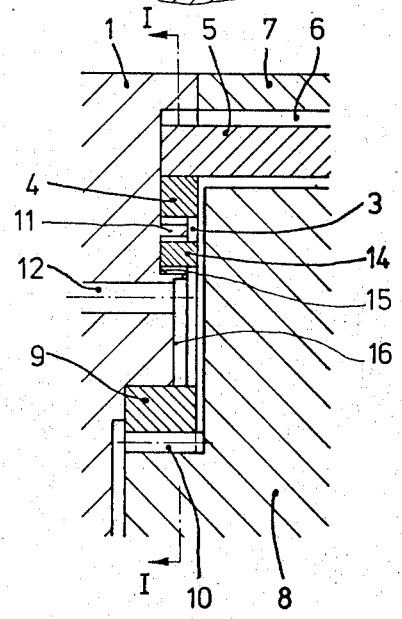
FIG. 2 is a section along line II—II OF FIG. 1.

The arrangement of FIG. 1, illustrating only a fraction of one of the side members 1, is understood to repeating itself symmetrically on the oppositely lying side member 1 on the other side of the central member 7 which closes down the housing on the other side. The sealing arrangement illustrated in FIGS. 1 and 2 and, especially the axial sealing strip 3, is lying in grooves formed in the side member 1 on each side, while the radial sealing strip 5 is placed in a groove 6 which is formed mainly in the central member 7 with a starting point in the respective side members 1, as seen in FIG. 2.

The piston 8 is arranged for rotation on a coupling toothed wheel 9 in the side member 1 by means of a pinion 10 which meshes with the toothed wheel 9. In the corner regions 11 between the coupling toothed wheel 9 and the sealing elements 3 and 4, an oil removing aperture 12 is provided which is halfway surrounded by a half-moon shaped oil removing strip 14 lying after it in the direction of rotation identified by the arrow 13. The oil removing strip 14 is placed in a groove 15 formed in the respective side members 1 and starts from the coupling toothed wheel 9; and it is constructed in a circular fashion and runs tangentially into the groove 2 into which the axial sealing strip 3 is placed.

About the oil removing aperture 12 there is formed an oil pocket 16 which extends ahead of the direction of rotation with respect to the oil removing aperture 12, so that it collects the oil before it reaches the oil removing aperture 12. By the provision of the oil removing strip 14 and by appropriately shaping the oil pocket 16, it is attained that only a slight amoung of oil should be restrained by the axial sealing strip 3 itself. As a result, the axial sealing strip 3 and the radial sealing strip 5 can be constructed to perform solely the function of gas sealing. As a further result, their untimely wear and soiling by the oil residues can be prevented.

I wish it to be understood that I do not desire to be limited to the exact details of construction shown and described for obvious modifications will occur to a person skilled in the art.

Having thus described the invention, what I claim as new and desire to be secured by Letters Patent, is as follows:

1. In a combustion engine having a rotary-type piston arrangement therein mounted for rotation on an eccentric shaft including a coupling toothed wheel means and a pinion meshing therewith in a housing having at least a pair of side members, at least one of which includes an oil removing opening, and a central member, said side members surrounding said rotary-type piston, a sealing arrangement performing the oil and gas-tight sealing of the respective operating spaces comprising at least axial sealing strip means provided in said side members, an oil removing strip means provided at least in one of said side members for aiding said axial sealing strip means, said oil removing strip means being half-moon shaped and being arranged in the direction of rotation after the oil removing opening, said oil removing strip means starting off tangentially with respect to said axial sealing strip means and ending in the region of the coupling toothed wheel means.

2. In a combustion engine having a rotary-type piston arrangement therein mounted for rotation on an eccentric shaft in a housing having at least a pair of side members and a central member, said members surrounding said rotary-type piston, a sealing arrangement for performing the oil and gas-tight sealing of the respective operating spaces comprising axial sealing strip means provided in said side members, an oil removing strip means provided at least in one of said side members for aiding said axial sealing strip means, an oil removing aperture means formed at least in one of said side members adjacent said oil removing strip means and an oil pocket means formed about said oil removing aperture means for collecting the oil ahead of said oil removing aperture means.

3. In a combustion engine having a rotary-type piston arrangement therein mounted for rotation on an eccentric shaft in a housing having at least a pair of side members and a central member, said members surrounding said rotary-type piston, a sealing arrangement performing the oil and gas-tight sealing of the respective operating spaces comprising axial sealing strip means provided in said side members, said axial sealing strip means being placed in a groove means formed in the respective side members and forming a symmetrical polygon in said side members with a number of corners, and oil removing strip means provided at least in one of said side members, said oil removing strip means being arranged essentially radially within the polygon of said axial sealing strip groove means in the corner regions of the polygon, said oil removing strip means being concavely curved against the direction of rotation of said rotary-type piston.

4. The combination as claimed in claim 3, wherein an oil removing aperture is formed at least in one of said side members and is arranged in the direction of rotation of said rotary-type piston before said oil removing strip means.

5. The combination as claimed in claim 4, wherein there is further included a coupling toothed wheel means and meshing pinion mounted on one of said side members and wherein said oil removing strip means starts off tangentially with respect to said axial sealing strip means and ends in the region of the coupling toothed wheel means mounted on one of said side members, said rotary-type piston rotating on said coupling toothed wheel by means of the meshing pinion arranged on said rotary-type piston.

6. The combination as claimed in claim 4, wherein an oil pocket means is formed about said oil removing aperture means for collecting the oil ahead of said oil removing aperture means.

* * * * *